May 18, 1965  C. H. McLAUGHLIN  3,183,872
HATCH COVER ASSEMBLY
Filed May 14, 1962  5 Sheets-Sheet 5

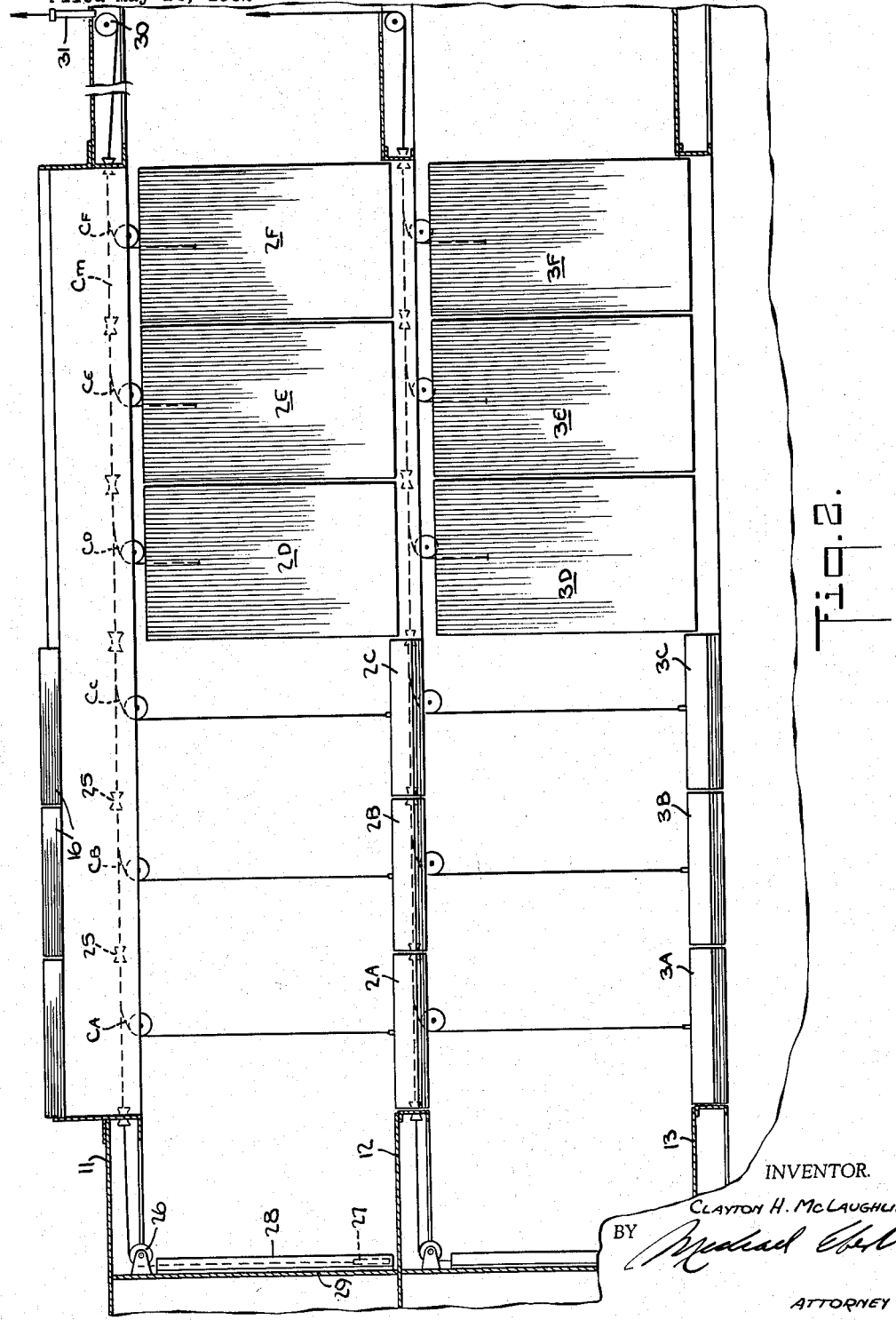

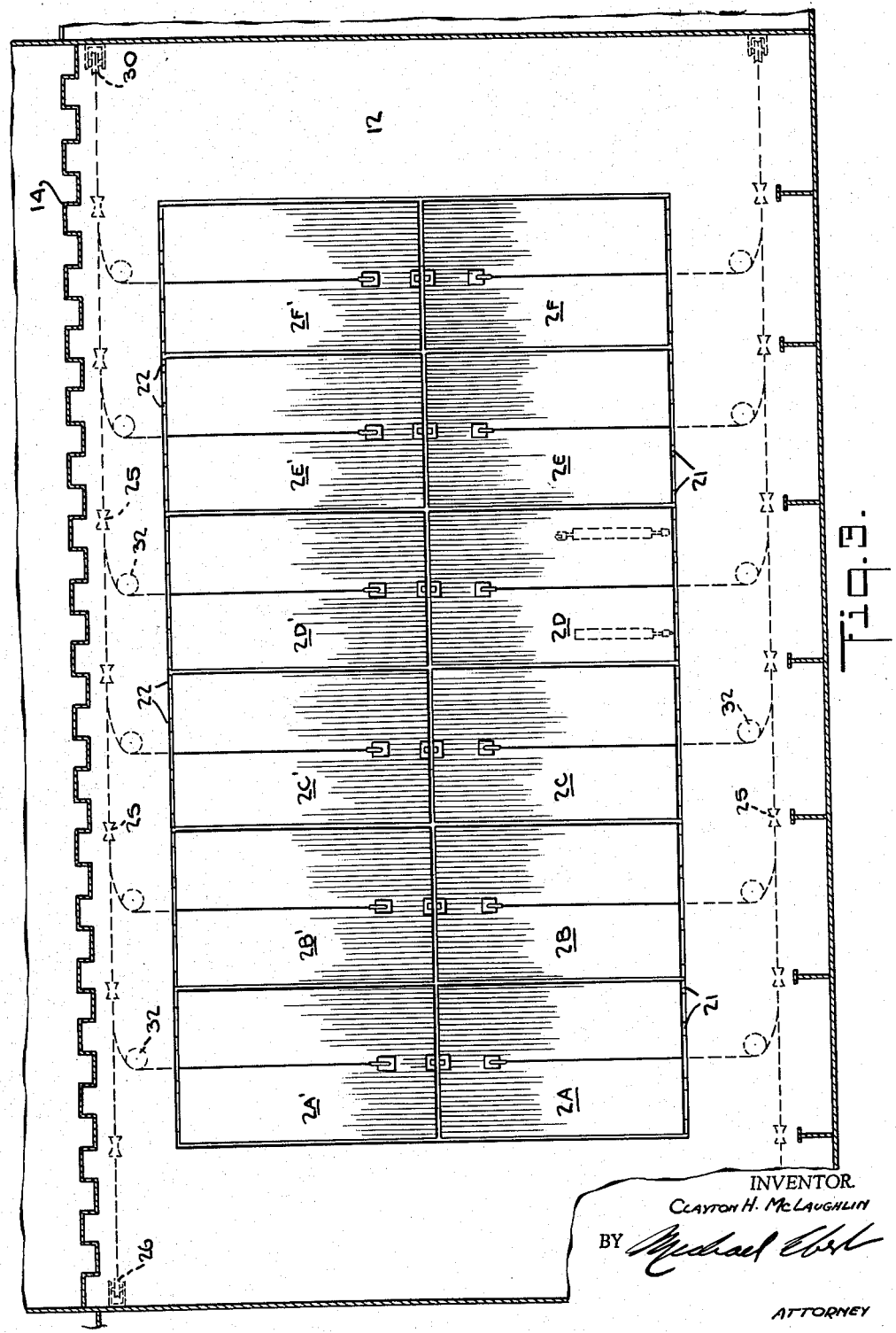

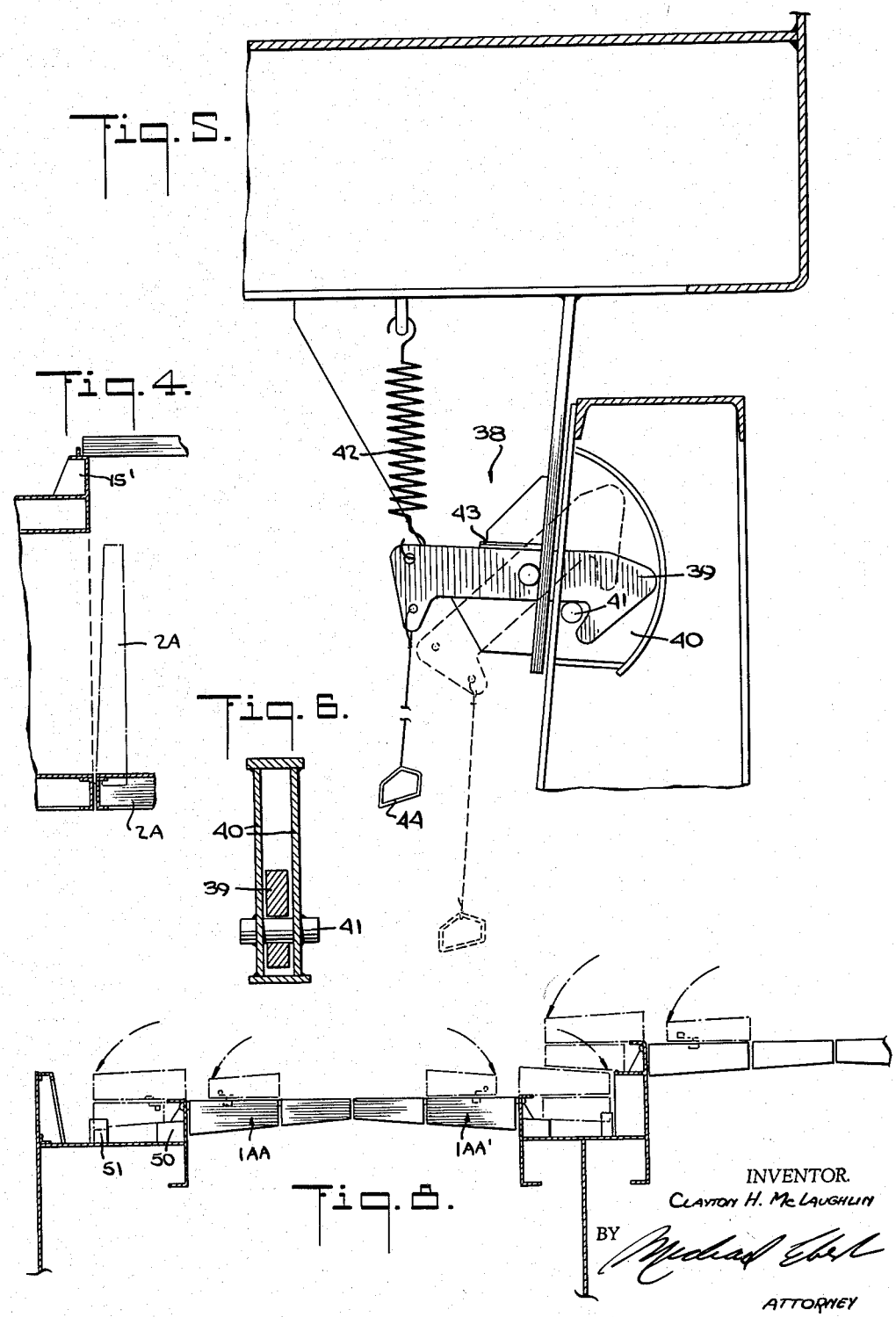

INVENTOR.
CLAYTON H. McLAUGHLIN
BY
ATTORNEY

United States Patent Office 3,183,872
Patented May 18, 1965

3,183,872
HATCH COVER ASSEMBLY
Clayton H. McLaughlin, 60 Remsen St., Brooklyn 1, N.Y.
Filed May 14, 1962, Ser. No. 194,373
1 Claim. (Cl. 114—201)

This invention relates generally to hatch covers for cargo-carrying vessels, and more particularly to a multiple-wing hatch cover assembly, the cantilevered wings of which may be selectively raised to provide ready access to any desired area in the hold of the vessel.

Cargo vessels or freighters employed in modern shipping are designed to handle a large volume of cargo in the form of crates, packages and other bulky objects varying in size, shape and weight. Generally such ships have an upper or weather deck below which are a series of so-called " 'tween" decks. To facilitate loading and unloading, the decks are provided with vertically aligned hatch openings through which cargo may be raised or lowered, usually by means of the ship's boom, the hatches being closed by means of beams placed across the opening.

Since cargo is ordinarily taken on or discharged at various points in the course of an extended voyage, the proper loading and unloading of the vessel is a problem of major importance. In planning a voyage, consideration must be given not only to the available space to be allotted a given load, but also to how access thereto can be had after other loads have been taken on. This problem is complicated by the character of existing hatch covers and the difficulties which are encountered in removing particular sections of such hatch covers.

" 'Tween" deck hatch covers of conventional design fall into three basic classes. In one class, portable transverse strongbacks are fitted into sockets attached to the sides of the hatch girders, cover boards being laid over the strongbacks and deck landings at the hatch ends. In a second class, steel pontoons are set transversely on the deck landings and are handled with the ship's boom.

The manipulation of such portable hatch beams is a hazardous and time-consuming operation which adds substantially to shipping costs. Moreover, difficulty is experienced in finding space to store the hatch beams when they are removed, and at times they must be stored on the weather deck or even on the dock.

A third class of hatch cover makes use of folding cover sections which are hinged to each other as well as to the deck at the hatch ends. These covers open longitudinally with the covers splitting and going to each end or all to one end, depending on the length of the hatch. The covers are handled with wire rope and winches or by hydraulic motors in the covers. While such folding covers overcome some of the drawbacks incident to the use of portable beams, they are relatively inflexible from the standpoint of area selection, for they do not readily give access to particular areas in the hold. For example, if access is desired to an area adjacent the hatch end, the entire cover must be withdrawn for this purpose, in that the end section cannot be raised without first lifting the other sections.

Another disadvantage of existing hatch cover arrangements is that when a cover beam or section is raised to expose a portion of the hatch opening, the deck sides thereof remain unprotected, thereby endangering personnel working in the area.

Accordingly, it is the main object of this invention to provide a multiple-wing hatch cover assembly for a cargo vessel, the assembly being composed of an array of cantilevered wings hinged to the sides of the hatch opening, each wing of which may be separately raised to give access to a specific hold area. The assembly is of particular value as applied to " 'tween" deck hatches, but it is also useful for weather deck hatches.

A significant feature of the invention is that the raised wing acts as a protective guard with respect to the deck passageway adjacent the hatch opening.

More specifically, it is an object of this invention to provide " 'tween" decks hatch cover assemblies of the above-described type, each of which is constituted by two like rows of wings, those in one row being hinged to one side of the hatch openings, and those in the other row to the other side thereof, such that correspondingly-positioned wings on the several " 'tween" decks are in vertical alignment and access to a selected area may be had by raising a series of such wings.

Also an object of this invention is to provide a hatch cover assembly of high structural strength, the closed wings of which lie flush with the surface of the deck and are capable of supporting heavy cargo loads. Where limited vertical space or headroom is available between decks, the wings may be of the folded type.

A further object of the invention is to provide a selector mechanism for a hatch cover assembly of the above-noted type, the mechanism being adapted selectively to raise any one of the cantilever wings or any group thereof.

Still another object of the invention is to provide a releasable locking device to prevent a raised hatch cover wing from accidentally dropping.

It is yet another object of the invention to provide a multiple-wing hatch cover assembly of high structural strength which may be manufactured at relatively low cost, the assembly being efficient and reliable in operation to effect a significant reduction in cargo handling costs.

Briefly stated, these objects are accomplished by a hatch cover assembly comprising an array of cantilever wings constituted by a pair of rows, the wings in one row being hingedly connected to one side of a hatch opening, and the wings in the other row being hingedly connected to the other side of said opening, whereby when the wings are closed they all lie flush with the deck and when the wings are raised to expose a section of the hatch opening they are substantially perpendicular thereto to form a protective guard with respect to the adjacent passageway.

A selector mechanism is provided for each row of wings, the mechanism including a main cable to which is joined at spaced positions a series of stub cables each one of which is connectable to a respective wing whereby when the main cable is pulled, all of the stub cables are simultaneously retracted, but only those wings are raised which are connected to their associated stub cables.

For a better understanding of the invention, as well as other objects and further features thereof, reference is made to the following detailed description to be read in conjunction with the accompanying drawings, wherein:

FIG. 2 is an elevational view through the hold of the vessel, showing how access is obtained to a particular area by opening corresponding wings in the hatch cover assemblies;

FIG. 3 is a plan view of one of the " 'tween" deck hatch cover assemblies;

FIG. 4 shows an alternative positioning of the coaming for the hatch opening on the upper deck;

Figure 7:
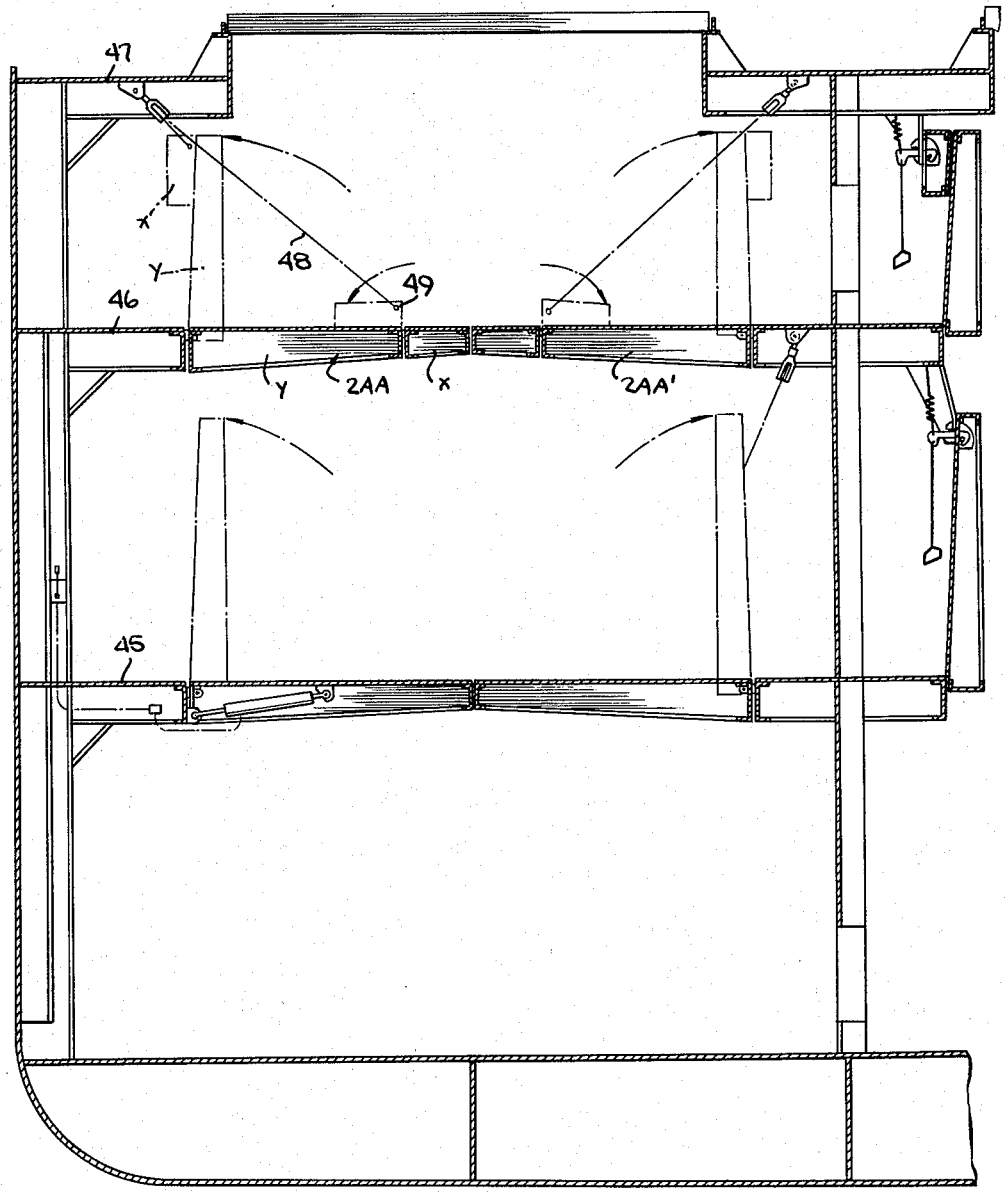

FIG. 5 separately shows in enlarged section, the locking device for one of the wings;

FIG. 6 is a transverse section taken through said locking device;

FIG. 7 is a section through a cargo hold, showing another preferred embodiment of the invention making use of folding wings; and FIG. 8 shows in section, a cover assembly for the upper deck of a cargo vessel.

Referring now to the drawings, there is shown a cargo ship constituted by a hull 10, an upper deck 11, a second deck 12 and a third deck 13. The ship is divided longitudinally by a centerline bulkhead 14 into a pair of cargo-receiving sections, only one of which is shown in detail in the figures. It is to be understood that the figures are only intended to be illustrative of the principles underlying the invention, and that similar hatch cover constructions may be incorporated in cargo vessels of different design and having a smaller or greater number of decks.

Upper deck 11 is provided with a hatch opening surrounded by a coaming 15, this opening being covered by hydraulically operated hatch cover sections 16 which may be of conventional design. The various deck girders are supported from the centerline bulkhead 14 and from the shell bulkhead 17. Access to the various holds is had through openings 18, 19 and 20 in bulkhead 14.

The second and third decks, which constitute the " 'tween" decks, are provided with identical hatch cover assemblies in vertical registration, in accordance with the invention. The second deck assembly, as best seen in FIG. 3, is formed by an array of cantilevered wings consisting of two rows of six wings each. The outboard wings 2A and 2F in one row are pivotally connected by hinges 21 to one side of the hatch opening, while the inboard wings 2A' and 2F' are pivotally connected by hinges 22 to the other side thereof. The third deck assembly has a like array of wings 3A to 3F, and 3A' to 3F', only wings 3A and 3A' being seen in FIG. 1.

Figure 1:
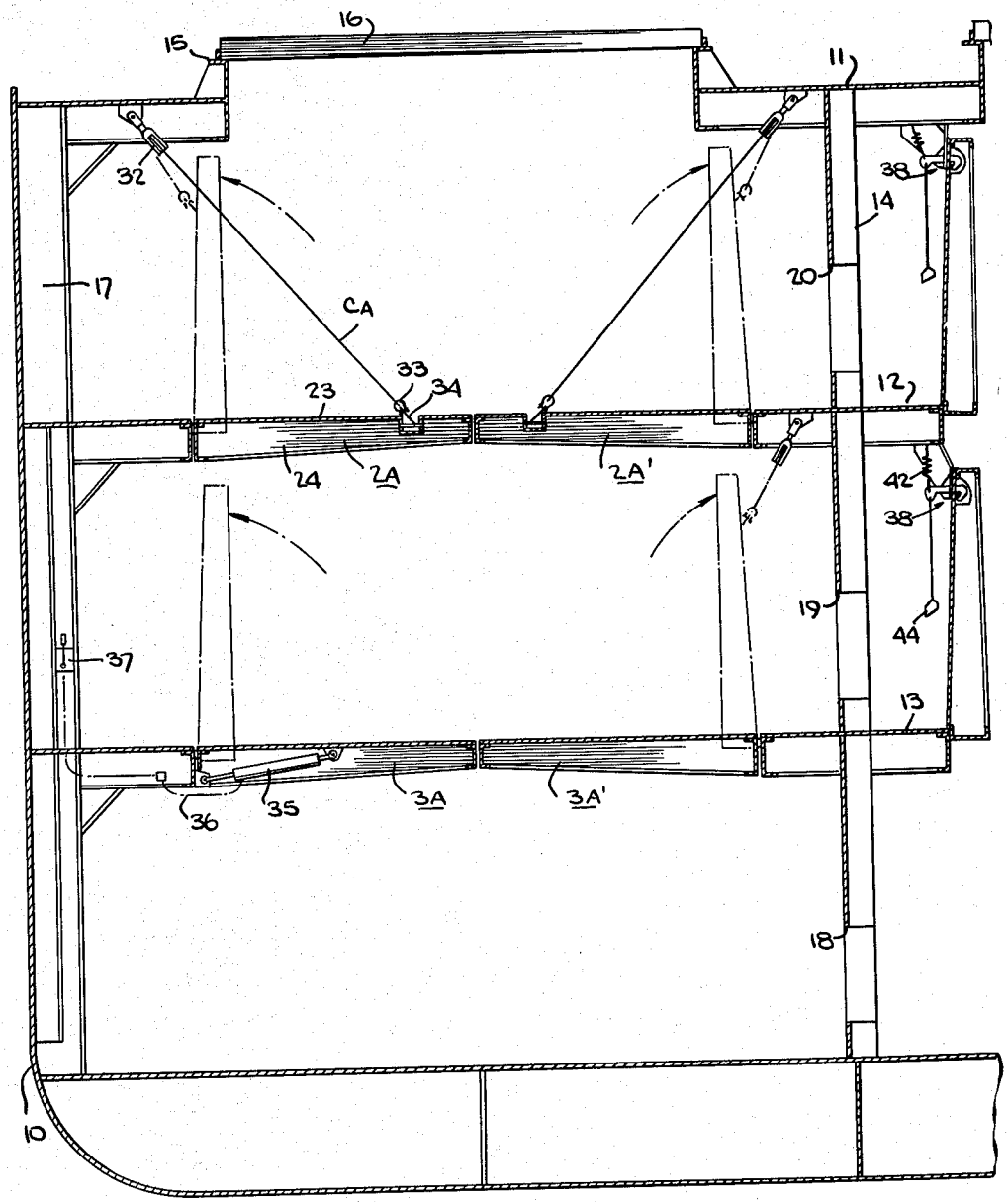
FIG. 1 is a transverse sectional view of a cargo vessel illustrating the cantilever wings of " 'tween" deck hatch cover assemblies in accordance with the invention, the wings being shown in both their closed and open positions.

The wings are preferably fabricated of steel or other fireproof material of great structural strength, and may, using wing 2A as an example, be formed of a top plate 23 supported on I beams 24 or similar structural members which are of tapered construction, as shown in FIG. 1. The wings lie flush with the deck surface when closed, and when they are all raised to their vertical position, the resultant hatch openings in the second and third decks are in vertical alignment with the hatch opening in the upper deck, as defined by coaming 15. The hatch opening on the upper deck may be enlarged by setting back coaming 15 in the manner illustrated in FIG. 4, wherein coaming 15' is vertically aligned with the edge of the hatch opening in the second deck rather than with the outer edge of the raised wing 2A.

Each row of wings in the hatch cover assembly is provided with a selector mechanism. This mechanism will be described with reference to FIG. 2, in connection with wing row 2A to 2F, where it will be seen that wings 2A, 2B and 2C are closed, while wings 2D, 2E and 2F are raised to their vertical position.

The mechanism for wing row 2A to 2F comprises a main or messenger cable $C_m$ which runs through guide spools 25 mounted at spaced positions along the undercarriage of the upper deck in a direction parallel to the side of the hatch opening in the second deck 12. One end of the main cable $C_m$ runs over a pulley 26 and terminates in a weight 27 movable within a vertical pipe guard 28 attached to a bulkhead 29, the weight riding from the bottom to the top of the pipe when the cable is pulled. The other end of the cable $C_m$ is guided by a pulley 30 through an outlet pipe 31 into a suitable winch (not shown) or other mechanical, hydraulic or electrical means for pulling the cable. When the cable is released, the weight 27 at the other end draws it back to its initial position.

Spliced or otherwise joined to the main cable $C_m$ is a series of stub cables $C_A$ to $C_F$, one for lifting each wing. As best seen in FIG. 1, each of the stub cables runs through a swivel block 32 and terminates in a hook or shackle 33 which is connectable with a ring 34 or other means mounted on the associated wing adjacent the free end thereof.

The length of the stub cables is sufficient to reach the lifting rings of the wings when the common main cable $C_m$ is released. In operation, when the main cable is pulled, only those wings connected to stub cables will be lifted, the main cable being pulled to an extent sufficient to raise the wings to their vertical position. When in their vertical position, the wings act as safety guards between the resultant hatch opening and the adjacent deck passageway.

Alternatively, as shown in FIG. 1, for wing 3A, the wings may be individually raised by means of hydraulic pistons 35 supplied with fluid through flexible line 36 and operated by a valve controller 37. The various hydraulic lines may be connected to a central control board or console for the selective raising of the wings on the various hatch cover assemblies.

When a wing is raised to its fully open position, it is latched against accidental dropping by an automatic locking device, generally designated by numeral 38. This device, as shown separately in FIGS. 5 and 6 for the second deck hatch door assembly, is constituted by a securing lever 39 which is pivotally mounted and is arranged to enter a recess formed by a pair of side plates 40 on the underside of the deck and is hooked to engage a securing pin 41. A spring 42 acts to maintain the securing lever against an abutment 43 and thereby hold it in its latched position.

To release the lever, a pull chain handle 44 is provided, which when pulled down against the tension of the spring, rotates the lever about its pivot point to disengage it from the pin 41. This handle is accessible in the passageway adjacent the hatch opening, and before the main cable is released the wing latches are first released. Thus there is a double security for the wings, one provided by the stub cables and the other by the locking device 38.

To lock a pair of inboard and outboard wings, such as 2A and 2A', together in the closed position, a draw bolt device (not shown) may be installed therebetween. This device can also be designed to assist the wings in resisting vertical loads imposed thereon. It is also to be noted that the hinged edge of each wing, when in the closed position, abuts the deck edge of the hatch opening which is of the same beam thickness. In this way the vertical load imposed on the cantilever wing produces a stress component which is directed against the deck edge of the hatch opening and is opposed thereby.

The operation of the hatch cover assemblies will now be reviewed with reference to FIG. 2. Let us assume that it is desired to store a cargo load in the hold below the third deck 13 in an area adjacent the wings 3D, 3E and 3F. To obtain access to this area, the stub cables in the second deck are attached to wings 2D, 2E and 2F, and the stub cables on the third deck are attached to wings 3D, 3E and 3F. When the associated main cables are pulled, these wings are raised and latched, and all other wings remain in the closed position. On the weather deck, those cover sections 16 are removed which are in line with the open wings. Thus the load may be lowered into the lowermost hold in the area desired without disturbing or raising any more wings than necessary for this purpose.

In some ship installations, the space or headroom between decks may not be sufficient to allow room for the raising of a hatch cover wing, and in such instances it is necessary, as shown in FIG. 7, to provide a folding wing structure. In this figure, a multiple-wing hatch cover assembly for the hatch opening on the third deck 45 is of exactly the same construction as the assemblies shown in the previous figures. But it will be noted, however, that in this vessel the space or headroom between the second deck 46 and the upper deck 47 is substantially smaller than that between the second deck 46 and the third deck 45. Hence there is not sufficient room to allow for the raising of a wing on the hatch cover for the second deck, if the wing has the same dimensions as those shown on the third deck. To overcome this problem, the hinged cantilever wings 2AA and 2AA' on the second deck are constituted by foldable sections X and Y which are hinged together, section X folding over section Y before the wing is raised. To raise the wing, the lifting cable 48 is first connected to the ring or other connecting device on section X and this wing is folded over section Y. Section X is provided with another lifting ring 49 which is positioned on the underside thereof and is accessible when this section is folded over on section Y. When the lifting cable 48 is coupled to ring 49, the folded wing may then be raised to the vertical position, as shown in this figure, there being enough space between decks to accommodate the folded wing.

A similar folding wing arrangement is shown in FIG. 8, for the upper deck of the vessel, the wing assembly including foldable wings 1AA and 1AA'. In this construction, when the wing sections are first folded over and then lifted, they are adapted to lie in a horizontal position, the larger wing section resting on the coaming 50, and the smaller wing section resting on an abutment 51, thereby fully exposing the hatch opening to provide maximum access. Releasable hatch mechanisms may be provided, if desired, to hold the folded wings together.

It will be evident that the invention not only expedites the handling of cargo but increases the flexibility of the cargo distributing system. While there have been shown what are considered to be preferred embodiments of the invention, it will be obvious that many changes and modifications may be made therein without departing from the essential spirit of the invention, as defined in the annexed claim.

What is claimed is:

In a cargo carrying vessel having a main deck and a plurality of 'tween decks, the decks having vertically aligned hatch openings which open up substantially the entire area of the associated deck, a cover assembly for each opening comprising an array of cantilever wings constituted by a pair of rows, the wings in one row being hingedly connected to one side of said opening and the wings in the other row being hingedly connected to the other side of said opening, whereby when the wings are closed they all lie flush with the deck, a selector mechanism for each deck for each row of wings including a main cable having a series of stub cables each connectable to one of said wings, and means to drive said main cable to pull said stub cables simultaneously and thereby raise only the wings connected thereto to a vertical position, whereby access to a particular area in said vessel may be had by raising corresponding wings in the deck assemblies.

References Cited by the Examiner

UNITED STATES PATENTS

| | | | |
|---|---|---|---|
| 341,632 | 5/86 | Bardsley | 268—18 X |
| 2,747,537 | 5/56 | Kummerman | 114—85 X |
| 2,923,265 | 2/60 | Pontoni et al. | 114—73 |
| 3,007,431 | 11/61 | Dahlin | 114—202 |
| 3,038,432 | 6/62 | Goldman | 114—72 |

FOREIGN PATENTS 70,315   11/58   France.
(1st addition to No. 1,164,208)

MILTON BUCHLER, *Primary Examiner.*

ANDREW H. FARRELL, *Examiner.*